(12) United States Patent
White et al.

(10) Patent No.: US 9,032,710 B2
(45) Date of Patent: May 19, 2015

(54) DIESEL DOSING SYSTEM FOR ACTIVE DIESEL PARTICULATE FILTER REGENERATION

(75) Inventors: Peter M. White, Hamden, CT (US); Michael Robert Valenches, Glastonbury, CT (US); Robert W. Zeiner, Torrington, CT (US); Andrew Jozef Brzoska, Burlington, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 918 days.

(21) Appl. No.: 12/673,229

(22) PCT Filed: Aug. 20, 2008

(86) PCT No.: PCT/US2008/073657
§ 371 (c)(1),
(2), (4) Date: May 10, 2011

(87) PCT Pub. No.: WO2009/026327
PCT Pub. Date: Feb. 26, 2009

(65) Prior Publication Data
US 2011/0203257 A1    Aug. 25, 2011

Related U.S. Application Data

(60) Provisional application No. 60/956,795, filed on Aug. 20, 2007.

(51) Int. Cl.
*F01N 3/00* (2006.01)
*F01N 3/035* (2006.01)
*F01N 3/025* (2006.01)
*F01N 3/36* (2006.01)
*F01N 9/00* (2006.01)

(52) U.S. Cl.
CPC .............. *F01N 3/035* (2013.01); *F01N 3/0253* (2013.01); *F01N 3/36* (2013.01); *F01N 9/002* (2013.01); *F01N 2560/06* (2013.01); *F01N 2560/08* (2013.01); *F01N 2610/03* (2013.01); *F01N 2610/08* (2013.01); *F01N 2610/1453* (2013.01); *F01N 2610/146* (2013.01)

(58) Field of Classification Search
USPC ..................................................... 60/274–324
See application file for complete search history.

(56) References Cited

U.S. PATENT DOCUMENTS

| 4,215,549 | A | 8/1980 | Daeschner |
| 4,719,751 | A | 1/1988 | Kume et al. |
| 5,884,475 | A * | 3/1999 | Hofmann et al. ............... 60/274 |
| 6,527,947 | B1 | 3/2003 | Channing et al. |

(Continued)

FOREIGN PATENT DOCUMENTS

| DE | WO2007/012512 | * | 2/2007 |
| EP | 1712278 A1 | | 10/2006 |

(Continued)

*Primary Examiner* — Jesse Bogue
(74) *Attorney, Agent, or Firm* — Renner, Otto, Boisselle & Sklar, LLP

(57) ABSTRACT

A diesel dosing module utilizes a diesel fuel shut-off valve, a diesel fuel dosing valve to provide dosing fuel to the inlet of a diesel oxidation catalyst and an air purge valve to purge fuel from a dosing line attached to the diesel dosing module and from a nozzle attached to a distal end of the dosing line. The valves are attached to a housing manifold which is remotely positionable from the nozzle and the high heat areas of the vehicle.

20 Claims, 4 Drawing Sheets

(56) References Cited

U.S. PATENT DOCUMENTS

| | | | |
|---|---|---|---|
| 6,832,473 B2 | 12/2004 | Kupe et al. | |
| 6,915,629 B2 | 7/2005 | Szymkowicz | |
| 6,952,919 B2 | 10/2005 | Otake et al. | |
| 6,969,413 B2 | 11/2005 | Yahata et al. | |
| 6,973,778 B2 | 12/2005 | Kondou et al. | |
| 7,017,335 B2 * | 3/2006 | Huber et al. | 60/286 |
| 7,040,299 B2 | 5/2006 | Dickerson | |
| 7,093,428 B2 | 8/2006 | LaBarge et al. | |
| 7,137,246 B2 | 11/2006 | van Nieuwstadt et al. | |
| 7,159,384 B2 | 1/2007 | Otake et al. | |
| 7,160,355 B2 | 1/2007 | Steiner | |
| 7,210,286 B2 | 5/2007 | Sun et al. | |
| 7,237,379 B2 | 7/2007 | Nakano et al. | |
| 7,243,488 B2 | 7/2007 | Bonadies et al. | |
| 7,337,607 B2 * | 3/2008 | Hou et al. | 60/274 |
| 7,409,823 B2 | 8/2008 | Price et al. | |
| 7,458,204 B2 * | 12/2008 | Plougmann | 60/286 |
| 7,703,276 B2 * | 4/2010 | Ueno | 60/286 |
| 7,874,148 B2 * | 1/2011 | Duffield | 60/297 |
| 8,029,249 B2 * | 10/2011 | Jochumsen et al. | 417/310 |
| 8,256,209 B2 * | 9/2012 | Rodriguez-Amaya et al. | 60/295 |
| 8,371,107 B2 * | 2/2013 | Haeberer et al. | 60/286 |
| 8,671,664 B2 * | 3/2014 | Garcia et al. | 60/286 |
| 2003/0200745 A1 | 10/2003 | Nieuwstadt et al. | |
| 2003/0230076 A1 | 12/2003 | Kwon | |
| 2005/0056005 A1 | 3/2005 | Otake et al. | |
| 2005/0284142 A1 | 12/2005 | Patil et al. | |
| 2006/0179821 A1 | 8/2006 | Zhan et al. | |
| 2007/0137187 A1 | 6/2007 | Kumar | |
| 2007/0196245 A1 | 8/2007 | Fujita et al. | |
| 2007/0277786 A1 * | 12/2007 | Barnes et al. | 123/478 |
| 2008/0016851 A1 * | 1/2008 | McCarthy et al. | 60/286 |
| 2008/0022668 A1 * | 1/2008 | Bugos et al. | 60/295 |
| 2008/0138215 A1 * | 6/2008 | Jochumsen et al. | 417/307 |
| 2009/0288399 A1 * | 11/2009 | Fayard | 60/295 |
| 2011/0016854 A1 * | 1/2011 | Gaudin et al. | 60/299 |
| 2011/0030334 A1 * | 2/2011 | Garcia et al. | 60/39.094 |

FOREIGN PATENT DOCUMENTS

| | | |
|---|---|---|
| WO | 200003790 A1 | 1/2000 |
| WO | 2004047963 A1 | 6/2004 |
| WO | 2006078761 A2 | 7/2006 |
| WO | 2006080816 A1 | 8/2006 |
| WO | 2006115632 A1 | 11/2006 |
| WO | WO 2007134929 A1 * | 11/2007 |

* cited by examiner ial filter. The diesel oxidation catalyst removes up to 90% of hydrocarbons and carbon monoxide and 10% of particulate matter. The diesel particulate filter is used to remove up to 95% of particulate matter. A diesel particulate filter must be operated at high temperatures to convert the particulate matter into less harmful constituents. If the diesel particulate filter temperature is too low, its capacity becomes finite and vehicle performance will become inhibited as a result of the increase in exhaust backpressure. The diesel particulate filter runs at a relatively high temperature of approximately 450 to 700° C. to initiate self regeneration. Operating under these conditions gives the diesel particulate filter an infinite capacity. To maintain the high diesel particulate filter temperature, it is important that the diesel oxidation catalyst operate at the high temperature as well as the close packaging of the two passive devices to reduce thermal losses. The diesel oxidation catalyst temperature is engine load dependant, therefore diesel oxidation catalyst/diesel particulate filter temperature may not always be at an optimum temperature for continuous diesel particulate filter regeneration.

DIESEL DOSING SYSTEM FOR ACTIVE DIESEL PARTICULATE FILTER REGENERATION

CROSS-REFERENCE TO RELATED CASES

The present application is a national stage application of International Patent Application No. PCT/US2008/073657 filed Aug. 20, 2008 which claims the benefit of U.S. Provisional Application Ser. No. 60/956,795; filed Aug. 20, 2007, the disclosure of which is expressly incorporated herein by reference.

TECHNICAL FIELD

The present invention relates to diesel dosing system for active diesel particulate filter regeneration wherein the system utilizes a single diesel dosing module having a small footprint.

BACKGROUND

As diesel emission requirements become more stringent, vehicle and engine manufacturers are forced to develop and implement diesel emission improvement strategies. The current effort is focused around reducing particulate matter, hydrocarbons and carbon monoxide while trying not to increase nitrogen oxide emissions. Engine and fuel technology can only reduce these emissions to a certain point; beyond this ancillary systems are required to meet emission regulations set by world-wide governing bodies.

One emission technology that is employed is the coupling of a diesel oxidation catalyst and a diesel particulate filter. The diesel oxidation catalyst removes up to 90% of hydrocarbons and carbon monoxide and 10% of particulate matter. The diesel particulate filter is used to remove up to 95% of particulate matter. A diesel particulate filter must be operated at high temperatures to convert the particulate matter into less harmful constituents. If the diesel particulate filter temperature is too low, its capacity becomes finite and vehicle performance will become inhibited as a result of the increase in exhaust backpressure. The diesel particulate filter runs at a relatively high temperature of approximately 450 to 700° C. to initiate self regeneration. Operating under these conditions gives the diesel particulate filter an infinite capacity. To maintain the high diesel particulate filter temperature, it is important that the diesel oxidation catalyst operate at the high temperature as well as the close packaging of the two passive devices to reduce thermal losses. The diesel oxidation catalyst temperature is engine load dependant, therefore diesel oxidation catalyst/diesel particulate filter temperature may not always be at an optimum temperature for continuous diesel particulate filter regeneration.

SUMMARY

At least one embodiment of the invention provides a diesel dosing module comprising: a housing having a fuel inlet attached to a source of fuel, an air inlet attached to a source of air, and a dosing fuel/air outlet; a dosing line attached to the dosing fuel/air outlet and having a nozzle at a distal end of the dosing line; a fuel shut-off valve and a diesel fuel dosing valve positioned at least partially within the housing; and an air purge valve positioned at least partially within the housing; wherein the fuel shut-off valve and diesel fuel dosing valve are capable of providing fuel to the nozzle; wherein the air purge valve is capable of purging fuel from the dosing line and the nozzle.

At least one embodiment of the invention provides a diesel dosing module comprising: a housing manifold having a fuel inlet attached to a source of fuel, an air inlet attached to a source of air, and a dosing fuel/air outlet; a dosing line attached to the dosing fuel/air outlet and having a nozzle at a distal end of the dosing line; a fuel shut-off valve and a diesel fuel dosing valve each attached to the housing manifold; and an air purge valve attached to the housing manifold; a housing cover attached to the housing manifold and enclosing the fuel shut-off valve, the diesel fuel dosing valve, and air purge valve; an electronic control unit at least partially enclosed by the housing manifold and the housing cover; wherein the fuel shut-off valve and diesel fuel dosing valve are capable of providing fuel to the nozzle; wherein the air purge valve is capable of purging fuel from the dosing line and the nozzle; and wherein the valves are controlled by the electronic control unit.

At least one embodiment of the invention provides a method for diesel dosing for a vehicle comprising the steps of: providing a diesel dosing module comprising a housing manifold having a fuel inlet, an air inlet, and a dosing fuel/air outlet, a dosing line attached to the dosing fuel/air outlet and having a nozzle at a distal end of the dosing line, a fuel shut-off valve, a diesel fuel dosing valve, and an air purge valve, each valve attached to the housing manifold; connecting a source of fuel to the housing manifold at the fuel inlet; connecting a source of air to the housing manifold at the air inlet; inserting the nozzle into an exhaust line at a position upstream of a diesel oxidation catalyst; connecting the housing manifold to the vehicle at a location remote from the nozzle; selectively providing fuel to the nozzle through the fuel shut-off valve and the diesel fuel dosing valve; selectively providing air to the nozzle through the air purge valve to purge fuel from the dosing line and the nozzle.

BRIEF DESCRIPTION OF THE DRAWINGS

Embodiments of this invention will now be described in further detail with reference to the accompanying drawings, in which.

DETAILED DESCRIPTION

Figure 1:
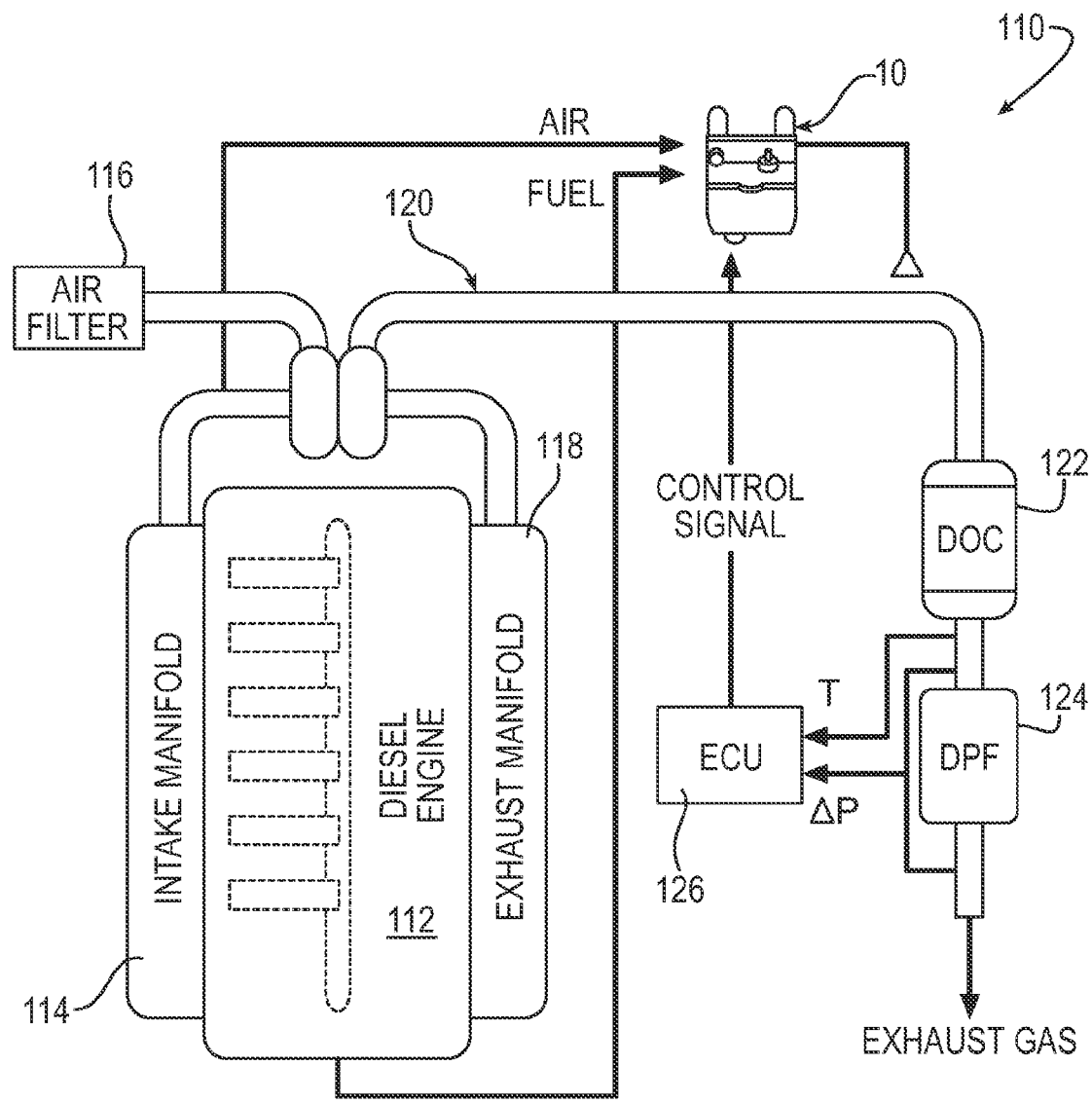
FIG. 1 is a schematic representation of an embodiment of the diesel dosing module in a diesel dosing application.
Figure 2:
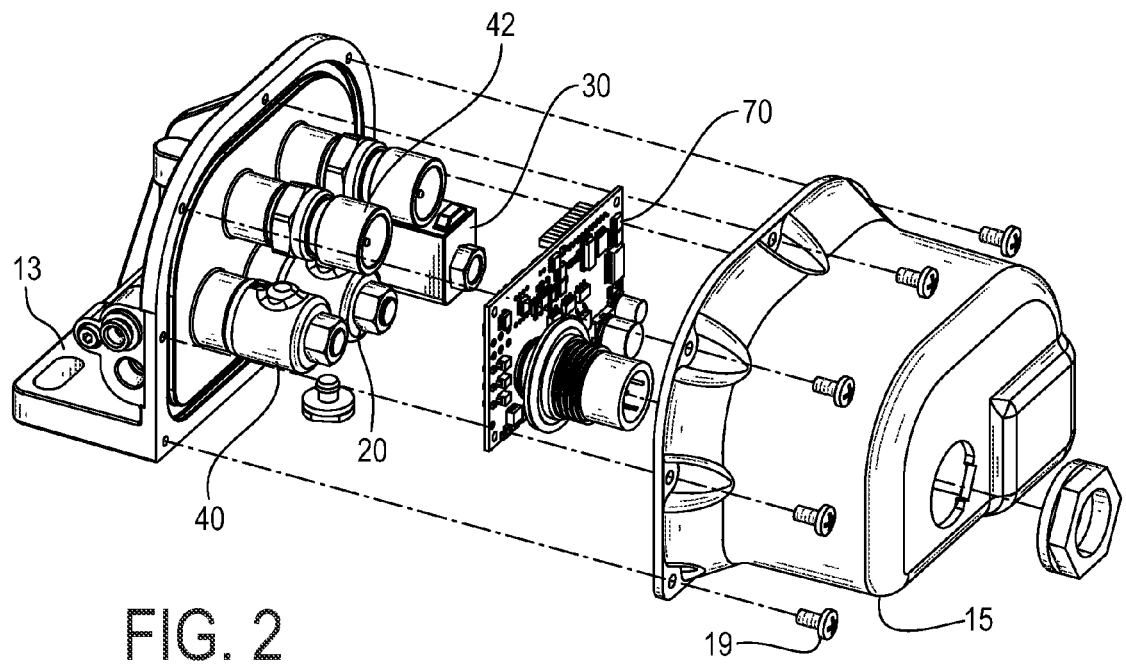
FIG. 2 is an exploded view of an embodiment of the diesel dosing module.

A diesel exhaust system 110 incorporating an embodiment of the diesel dosing module 10 of the present invention is shown in FIG. 1. A diesel engine 112 has an air intake manifold 114 that supplies filtered air through air filter 116 of the diesel dosing module 10. The exhaust from the diesel engine 112 is passed by the exhaust manifold 118 to the exhaust pipe 120 which includes a diesel oxidation catalyst 122 and a diesel particulate filter 124. Filtered fuel is diverted from the diesel engine 112 to the diesel dosing module 10. Filtered air is diverted to the diesel dosing module 10. The diesel dosing module 10 may be connected to the vehicle's electronic control unit 126 which may receive temperature information at the exit of the diesel oxidation catalyst 122 and backpressure drop information from the ends of the diesel particulate filter 124. The vehicle electronic control unit 126 may use the temperature and backpressure data to control the diesel dosing module 10. The diesel dosing module 10 provides a precise amount of finely atomized diesel fuel to the exhaust pipe 120 prior to the inlet of the diesel oxidation catalyst 122. When the vaporized fuel comes in contact with the diesel oxidation catalyst's 122 Platinum and/or Palladium internal structure, an exothermic chemical reaction occurs and heat is rejected. To maintain the appropriate temperature for continuous regeneration, a closed loop control system is employed using diesel oxidation catalyst 122 temperature as a driving parameter. Exhaust system backpressure feedback can also be used to determine the condition of the diesel particulate filter 124 and the amount it may have become choked with particulate matter.

The diesel dosing module 10 shown in FIGS. 2-7 comprises a housing 12 having a fuel inlet 14 attached to a source of fuel, an air inlet 16 attached to a source of air, and a dosing fuel/air outlet 18. A dosing line 50 is attached to the dosing fuel/air outlet 18. A nozzle 60 is attached to the dosing line 50 at a distal end of the dosing line 50 remote from the module 10 such that the module 10 is positionable in a location away from high temperature areas. The nozzle 60 is positioned to spray fuel into the exhaust pipe 120 upstream of the diesel oxidation catalyst 122. In one embodiment of the invention, the nozzle 60 is a Parker Macrospray® nozzle. The module 10 further comprises a fuel shut-off valve 20 and a diesel fuel dosing valve 30 positioned at least partially within the housing 12, and an air purge valve 40 positioned at least partially within the housing 12. As shown, the housing 12 comprises a manifold 13 and a cover 15 which generally contain and protect the contents of the module 10. The cover 15 is shown attachable to the manifold 13 by fasteners 19. The fuel shut-off valve 20 and diesel fuel dosing valve 30 are attached to the manifold 13 and are capable of providing fuel to the nozzle 60. The air purge valve 40 is attached to the manifold 13 and is capable of purging fuel from the dosing line 50 and the nozzle 60. A check valve 44 prevents fuel from entering the air line.

The operation of the module 10 may be controlled by an electronic control unit 70 that is at least partially enclosed in the housing 12 and remotely attached to the electronic control unit 126 of the vehicle. This attachment may be through a CAN bus or other known means. The electronic control unit 70 may operate based on data received from the electronic control unit 126 of the vehicle as discussed above. Alternatively, the module 10 does not contain an electronic control unit 70, but is controlled directly by the vehicle electronic control unit 126.

As mentioned, the vehicle electronic control unit 126 monitors diesel oxidation catalyst temperature and diesel particulate filter backpressure and makes a decision on whether hydrocarbon dosing is required and, when required, how much fuel is to be introduced into the diesel oxidation catalyst 122. The dosing system electronic control module 70 takes that information and manages the module functions. The electronic control unit 70 manages the fuel shut-off valve 20 state. The fuel shut-off valve 20 is a digital valve that is open when dosing. The electronic control unit 70 manages the diesel dosing valve 30 duty cycle. The duty cycle proportionally varies between 5% and continuously open. The electronic control unit 70 manages the air purge valve 40 state. The air purge sequence is used at the end of a dosing cycle to purge the fuel lines of fuel. A maintenance purge can also be added prior to the dosing cycle to clear soot from the tip of the nozzle.

In one embodiment of the invention, the diesel dosing module 10 comprises one or more pressure transducers 42, 22 which can provide information about the health of the nozzle 60 during the fuel purge sequence. The electronic control unit 70 or 126 also manages the nozzle condition.

Figure 3:
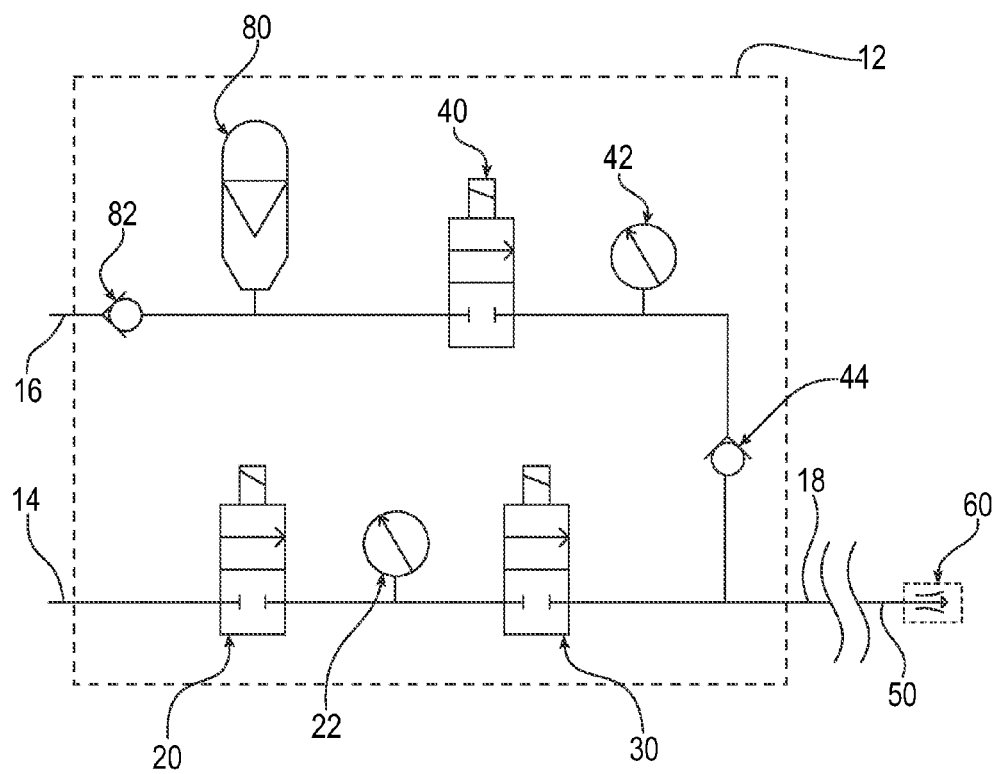
FIG. 3 is a schematic view of an embodiment of the diesel dosing module.
Figure 4:
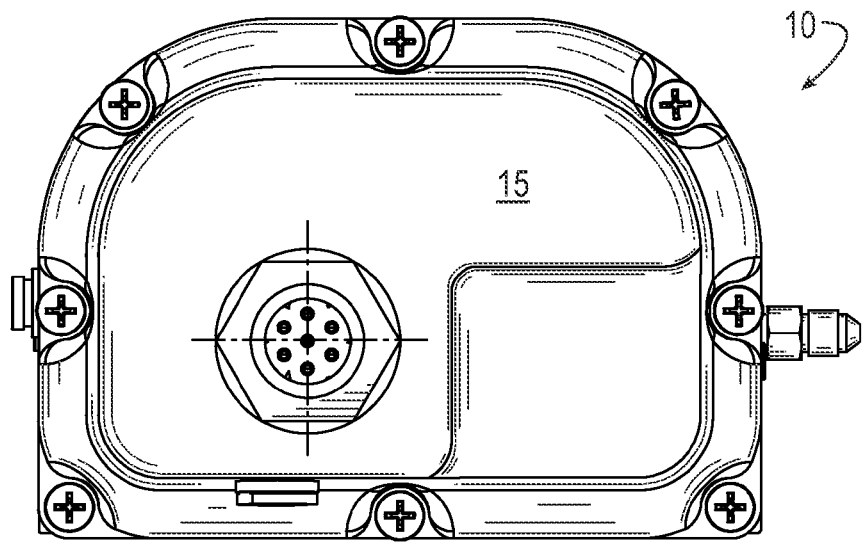
FIG. 4 is an elevational view of the electronic connector cover side of the diesel dosing module.
Figure 5:
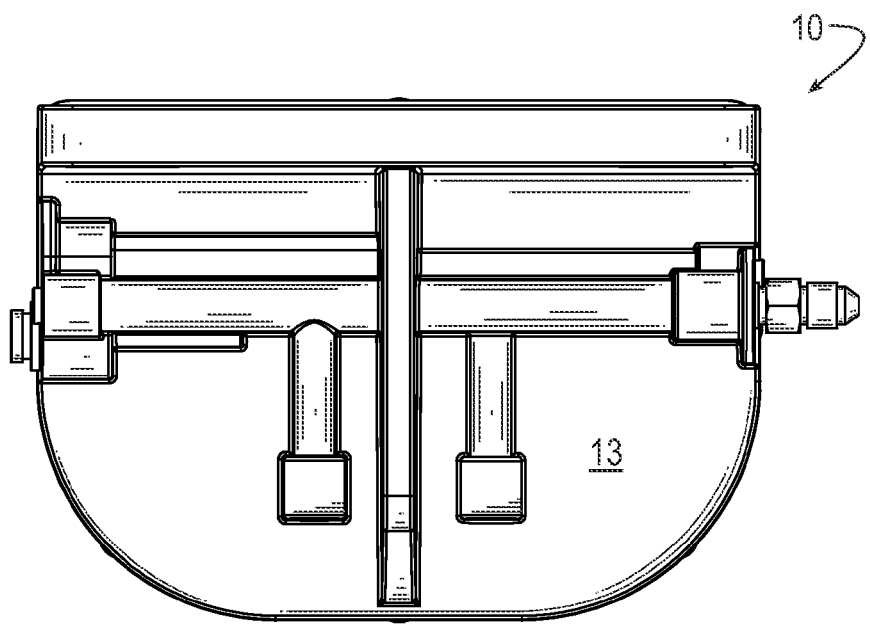
FIG. 5 is an elevational view of the manifold side of the diesel dosing module.
Figure 6:
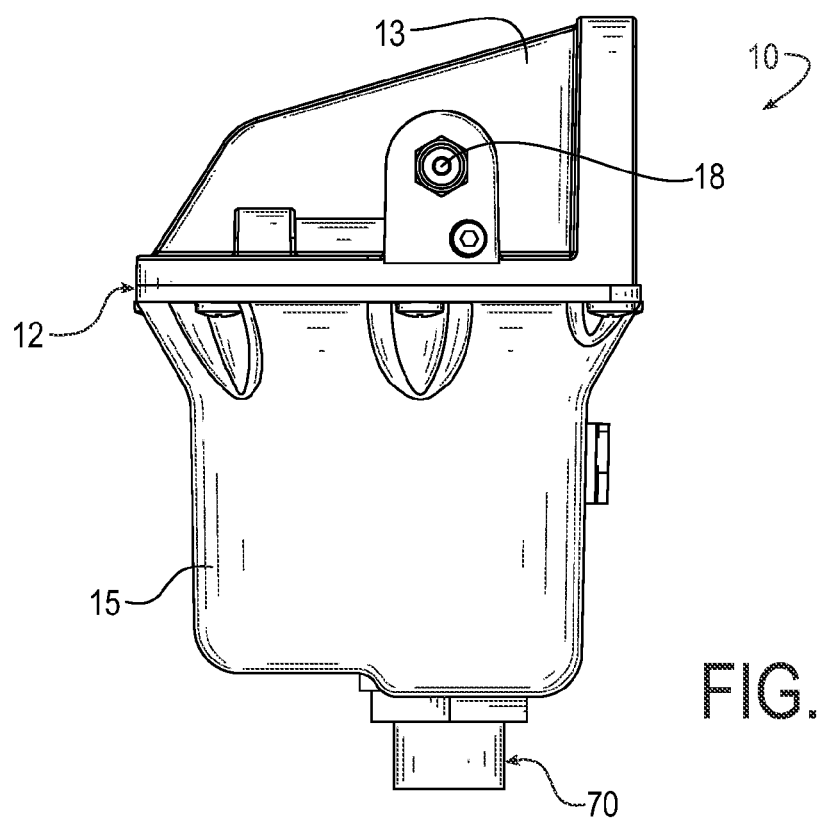
FIG. 6 is an elevational view of the dosed fuel outlet side of the diesel dosing module.
Figure 7:
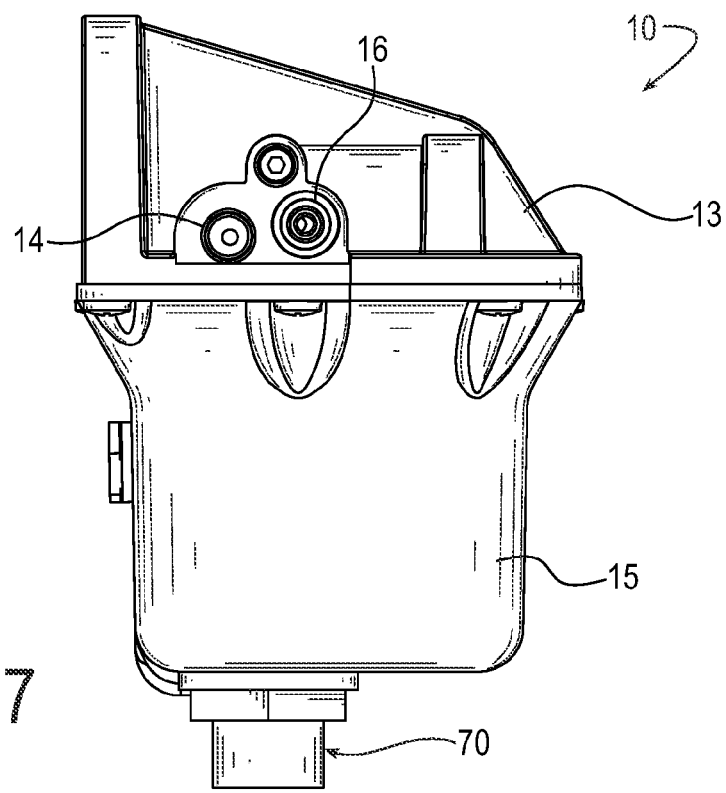
FIG. 7 is an elevational view of the fuel and air inlet side of the diesel dosing module.

The air sources used by the diesel dosing module 10 can be from the vehicle air system that is traditionally supplied by an on engine compressor. In some instances, such as when the engine has a turbocharger, peak turbocharger air pressure is stored in an accumulator 80 that has an application specific volume. The accumulator 80 is depicted in FIG. 3 and shown with an air check valve 82. It is also contemplated that a supplemental air system could be utilized and, if required, an accumulator 80 that has an application specific volume.

The vehicle data obtained by the electronic control unit 126 may also be used to predict shutdown such as when processes inputs from brake position switch, parking brake switch or driveshaft speed sensor indicate that an air purge sequence can be initiated by the electronic control unit 70. This is beneficial during shutdown while fuel is in the lines can cause a heat soak condition that can lead to nozzle and or fuel line coking.

The electronic control unit 70 can also be used for on board diagnostics. For example, the system can predict nozzle health (coked) by measuring nozzle pressure drop over time; conduct diagnostics for determining proper valve function; adjust valve inputs depending on the valve's response conditions to allow for a consistent flow; and adjust the diesel dosing valve's response depending on fuel temperature to allow for a consistent flow.

As an example, operation of the diesel dosing module 10 will be described. When predetermined conditions are met, the operation of the diesel dosing cycle is initiated by the vehicle electronic control unit 126. The fuel cut-off valve 20 is opened and the diesel dosing valve 30 is opened. The filtered fuel flows through the valves 20, 30, through the fuel dosing line 50, and through the nozzle 60 which vaporizes the fluid prior to the fluid entrance of the diesel oxidation catalyst 122. When the vaporized fuel comes in contact with the diesel oxidation catalyst's Platinum and/or Palladium internal structure, an exothermic chemical reaction occurs and heat is rejected.

The operation may begin and/or end with an air purge operation wherein the air purge valve 40 is opened and the air flows through the fuel dosing line 50 and through the nozzle 60. The air purge valve 40 is then closed after a predetermined time. Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

The invention claimed is:

1. A diesel exhaust gas treatment module for a vehicle having a diesel oxidation catalyst in an exhaust pipe, the module comprising:

a housing having a fuel inlet for receiving filtered fuel that has been diverted from a diesel engine to the fuel inlet, an air inlet attached to a source of filtered air, and an outlet;

a dosing line fluidly connecting the outlet to a nozzle that vaporizes the fuel and is positioned to spray the fuel into the exhaust pipe upstream of the diesel oxidation catalyst, the nozzle receiving either fuel or air based upon an operational state of the module;

a fuel shut-off valve and a diesel fuel dosing valve positioned at least partially within the housing and configured to supply fuel to the nozzle when the module is in a dosing operational state; and an air purge valve positioned at least partially within the housing and configured to supply air to the nozzle to purge fuel from the dosing line and the nozzle during an air purge operational state.

2. The diesel exhaust gas treatment module of claim 1, further comprising an electronic control unit.

3. The diesel exhaust gas treatment module of claim 2, wherein the fuel shut-off valve, the diesel fuel dosing valve and the air purge valve are controlled by the electronic control unit.

4. The diesel exhaust gas treatment module of claim 1, further comprising a controller that monitors an operating condition of the nozzle.

5. The diesel exhaust gas treatment module of claim 1, comprising an air accumulator at least partially within the housing.

6. The diesel exhaust gas treatment module of claim 5, further comprising a check valve between the air inlet and the air accumulator and a check valve between the air purge valve and the outlet.

7. The diesel exhaust gas treatment module of claim 1, wherein the actuation of the fuel shut-off valve and the diesel fuel dosing valve are directly related to a sensed outlet temperature of a diesel oxidation catalyst.

8. The diesel exhaust gas treatment module of claim 2, wherein the electronic control unit is positioned at least partially within the housing.

9. The diesel exhaust gas treatment module of claim 4, further comprising a pressure transducer in communication with the controller and configured to sense pressure indicative of an operating condition of the nozzle.

10. A diesel exhaust gas treatment module for a vehicle having a diesel oxidation catalyst in an exhaust pipe, the module comprising:

a housing manifold having a fuel inlet for receiving filtered fuel that has been diverted from a diesel engine to the fuel inlet, an air inlet attached to a source of filtered air, and an outlet;

a dosing line fluidly connecting the outlet to a nozzle that vaporizes the fuel and is positioned to spray the fuel into the exhaust pipe upstream of the diesel oxidation catalyst, the nozzle receiving either fuel or air based upon an operational state of the module;

a fuel shut-off valve and a diesel fuel dosing valve each attached to the housing manifold and configured to supply fuel to the nozzle when the module is in a dosing operational state;

an air purge valve attached to the housing manifold and configured to supply air to the nozzle to purge fuel from the nozzle during an air purge operational state;

a housing cover attached to the housing manifold and enclosing the fuel shut-off valve, the diesel fuel dosing valve, and the air purge valve; and an electronic control unit at least partially enclosed by the housing manifold and the housing cover, wherein the fuel shut-off valve, the diesel fuel dosing valve and the air purge valve are controlled by the electronic control unit.

11. The diesel exhaust gas treatment module of claim 10, wherein the electronic control unit of the module is adapted to be connected to an electronic control unit of a vehicle.

12. The diesel exhaust gas treatment module of claim 10, further comprising a pressure transducer attached to the manifold, the pressure transducer capable of monitoring an operating condition of the nozzle.

13. The diesel exhaust gas treatment module of claim 10, further comprising an air accumulator.

14. The diesel exhaust gas treatment module of claim 13, further comprising a check valve between the air inlet and the air accumulator.

15. The diesel exhaust gas treatment module of claim 13, wherein the air accumulator operates with a turbocharger of a vehicle to store peak turbocharger air.

16. A method for diesel exhaust gas treatment for a vehicle comprising:

connecting a source of fuel to a housing manifold at a fuel inlet and diverting fuel from a diesel engine of the vehicle to the fuel inlet;

connecting a source of air to the housing manifold at an air inlet;

inserting a nozzle that vaporizes fuel into an exhaust line of the vehicle at a position upstream of a diesel oxidation catalyst, wherein the nozzle is fluidly coupled to an outlet of the housing manifold via a dosing line;

connecting the housing manifold to the vehicle at a location remote from the nozzle;

selectively providing either fuel or air to the nozzle based upon an operational state of the module, wherein in a dosing operational state fuel is supplied to the nozzle through a fuel shut-off valve, a diesel fuel dosing valve and the dosing line, and in an air purge operational state air is supplied to the nozzle through an air purge valve to purge fuel from the dosing line and the nozzle.

17. The method of claim 16, further comprising monitoring at least one of the diesel oxidation catalyst outlet temperature and the pressure drop between an inlet and an outlet of a diesel particulate filter with an electronic control module, wherein selectively providing fuel to the nozzle through the fuel shut-off valve and the diesel fuel dosing valve is determined by the vehicle electronic control module.

18. The method of claim 16, wherein selectively providing air to the nozzle through the air purge valve to purge fuel from the dosing line and the nozzle is determined by a vehicle electronic control module based in response to at least one of: diesel oxidation catalyst outlet temperature, pressure drop between an inlet and an outlet of a diesel particulate filter, inputs from a vehicle brake position switch, inputs from a parking brake switch, and inputs from a driveshaft speed sensor.

19. The method of claim 16, further comprising periodically monitoring the pressure decay rate of a fixed volume of air through the nozzle to determine a condition of the nozzle.

20. The method of claim 16, further comprising adjusting the diesel dosing valve's response depending on fuel temperature to allow for a consistent flow.

* * * * *